United States Patent [19]

Brashier et al.

[11] Patent Number: 4,957,691
[45] Date of Patent: Sep. 18, 1990

[54] APPARATUS FOR INSPECTING THE QUALITY OF NUCLEAR FUEL ROD ENDS

[75] Inventors: Raymond W. Brashier, Columbia, S.C.; Edward D. Pfau, Bostic, N.C.

[73] Assignee: Westinghouse Electric Corp., Pittsburgh, Pa.

[21] Appl. No.: 359,000

[22] Filed: May 30, 1989

[51] Int. Cl.⁵ ............................................. G21C 17/06
[52] U.S. Cl. .................................. 376/245; 376/248; 378/175; 378/181
[58] Field of Search ................ 376/245, 248, 260, 261, 376/251; 378/172–177, 181; 250/327.2 R, 327.2 C; 198/346.3, 468.8

[56] References Cited

U.S. PATENT DOCUMENTS

| | | | |
|---|---|---|---|
| 2,928,005 | 3/1960 | Yerkovich | 378/181 |
| 3,383,506 | 5/1968 | Bock et al. | 378/176 |
| 4,051,369 | 9/1977 | Takeshita | 378/58 |
| 4,071,767 | 1/1978 | Pury et al. | 378/176 |
| 4,107,535 | 8/1978 | Kotabe et al. | 378/93 |
| 4,135,089 | 1/1979 | McIntyre | 378/91 |
| 4,554,128 | 11/1985 | Parker et al. | 376/251 |
| 4,591,044 | 5/1986 | Ogami et al. | 198/346.3 |
| 4,651,337 | 3/1987 | Boomgaarden et al. | 378/181 |
| 4,659,929 | 4/1987 | Fujiwara et al. | 250/327.2 |
| 4,667,102 | 5/1987 | Koyama et al. | 250/327.2 |
| 4,829,182 | 5/1989 | Kageyama | 378/175 |

FOREIGN PATENT DOCUMENTS 0172295 7/1987 Japan ................... 376/245

Primary Examiner—Daniel D. Wasil
Attorney, Agent, or Firm—J. C. Spadacene

[57] ABSTRACT

An apparatus for inspecting the quality of both ends of nuclear fuel rods includes a housing with longitudinally separated slots for receiving X-rays downwardly therethrough to define first and second operating positions so that the forward ends of nuclear fuel rods can be aligned below the first operating position and the rear ends of nuclear fuel rods can be aligned below the second operating position. An endless conveyor belt system, having at least three longitudinally spaced apart cleats mounted thereon to define first and second film cartridge receptacles, is adapted to advance X-ray film cartridges longitudinally through the housing. A table is included for selectively lifting the film cartridges from the belt system to maintain the film cartridges stationary while the conveyor belt system is advanced. As film cartridges are advanced through the housing, they are exposed to X-rays at the first and second operating positions to image each end of a given fuel rod by initially positioning each film cartridge in the first receptacle and moving the conveyor belt to align the first receptacle with the first operating position and then transferring the film cartridge to the second receptacle by lifting the cartridge from the belt by the table and advancing the conveyor belt rearwardly to align the second receptacle and cartridge into alignment with the second operating position.

10 Claims, 4 Drawing Sheets

CLEAT POSITION FOR EXPOSURE NOS. 1 & 4

CLEAT POSITION FOR EXPOSURE NOS. 2 & 5

CLEAT POSITION FOR EXPOSURE NOS. 3 & 6

CLEAT POSITION FOR FILM UNLOADING

CLEAT POSITION FOR LOADING

CLEAT POSITION FOR EXPOSURE NOS. 1 & 4, (REPEAT OF PROCESS)

APPARATUS FOR INSPECTING THE QUALITY OF NUCLEAR FUEL ROD ENDS

This invention relates to an apparatus and method for inspecting the quality of both ends of nuclear fuel rods and more particularly to a method and apparatus for inspecting the quality of both ends of nuclear fuel rods by exposing the rod ends to X-rays and imaging the rod ends onto film cartridges aligned underneath the rod ends.

BACKGROUND OF THE INVENTION

The core in a nuclear reactor uses a large number of precision manufactured nuclear fuel rods containing fissionable pellets therein. The fuel rods typically are manufactured from open-ended tubular rods made from a zirconium alloy. One end of the rod is plugged with a zirconium alloy end plug and girth welded by conventional tungsten inert gas methods. The fissionable pellets are inserted into the rod through its open end which then is plugged and girth welded. Afterward, the rod is pressurized and seal welded.

Weld quality is a paramount concern in the manufacture of these rods. During fission, gas pressure builds in a fuel rod. A poor weld could create a gas leak at the weld seam resulting in rod depressurization and increased coolant radioactivity. If the rod depressurizes, the high pressure attendant the reactor core could collapse the rod creating reactor operational problems. Thus, before the rods are inserted into a reactor core, their welded ends are inspected to assure a strong weld has been obtained.

Most nuclear fuel rods are inspected in apparatus using X-ray analysis. Typically, nuclear fuel rods are serially guided through a housing having a pair of longitudinally separated slots for receiving X-rays downwardly from an external source so as to define first and second longitudinally spaced apart operating positions. The rods are guided through the housing to a first rod position where the forward ends of the rods are aligned below the first operating position and to a second rod position where the rear ends of the rods are aligned below the second operating position. X-ray film cartridges are serially advanced through the housing below the rods on an endless conveyor belt and exposed to X-rays to image each end of the fuel rod. In prior art systems, the conveyor is operated unidirectionally and includes spaced-apart cleats for defining receptacles to hold the film cartridges therein.

Usually, the conveyor is advanced incrementally so that multiple exposures of each rod end are taken on one film cartridge. The rods are rotated a fixed angular amount before each exposure to obtain an image of the fuel rod end in a different orientation. Additionally, each film cartridge is exposed to image both front and rear ends of a rod by guiding a rod from the first operating position to the second operating position and advancing the conveyor to move a film cartridge from the first to the second operating position. Multiple exposures are taken again.

As the conveyor is advanced, one completed film cartridge is removed and a new cartridge placed onto the conveyor. The new film cartridge is positioned on the conveyor and aligned below the first operating position so that simultaneous with the multiple exposure of the rear end of a first rod which has been advanced to the second operating position, the front end of a new rod which has been guided into the housing is exposed at the first operating position. The cycle continues as rods are guided through the housing and the conveyor is advanced so that exposed film cartridges are removed from one end of the conveyor near the second operating position and new film cartridges are positioned on the conveyor near the first operating position.

One drawback of the prior art practice is the error accumulation attendant any mechanical conveyor system. Each multiple exposure of a rod end requires a predetermined incremental advancing of the film cartridge below the rod end a distance at least as great as the width of the slot through which X-rays pass to prevent overlap of successive exposures on the film cartridge. However, because the conveyor is unidirectional, any mechanical error is amplified. This accumulated error makes accurate incremental positioning of a film cartridge difficult causing overlap between exposures resulting in poor quality X-ray images.

It is therefore an object of the present invention to provide an apparatus and method for inspecting the quality of both ends of nuclear fuel rods which overcomes the above-noted deficiencies of the prior art practices.

It is a more particular object of the present invention to provide an apparatus and method for inspecting the quality of both ends of nuclear fuel rods wherein the mechanical error normally associated with a conveyor system used in advancing film cartridges serially through an X-ray housing of the above-noted prior art practice is minimized.

It is still another object of the present invention to provide an apparatus and method for inspecting the quality of both ends of nuclear fuel rods wherein a film cartridge positioned at a first receptacle can be transferred to a second receptacle to eliminate the use of a unilateral conveyor system so as to minimize mechanical error.

SUMMARY OF THE INVENTION

These and other objects and advantages of the present invention are accomplished by an apparatus and method for inspecting the quality of both ends of nuclear fuel rods. The apparatus includes a housing having a pair of longitudinally separated slots for receiving X-rays downwardly therethrough from an external source so as to define first and second longitudinally spaced apart operating positions. Means are included for serially guiding nuclear fuel rods longitudinally through the housing to a first rod position wherein the forward ends of the rods are aligned below the first operating position and to a second rod position wherein the rear ends of the rods are aligned below the second operating position.

A belt conveyor assembly serially advances X-ray film cartridges longitudinally through the housing and below the rods so that a cartridge may be selectively aligned below the first and second operating positions. The belt conveyor assembly comprises at least one endless conveyor belt and at least three longitudinally spaced apart cleats mounted on the conveyor belt so as to define first and second film cartridge receptacles between respective pairs of cleats. A drive means selectively advances the conveyor belt in opposite directions. A table selectively lifts the film cartridges from the conveyor belt so that the conveyor belt may be advanced while the film cartridges are held stationary.

In operation, film cartridges are serially advanced through the housing and exposed to X-rays at each of the first and second operating positions. Each film cartridge is adapted to image each end of a given fuel rod by initially positioning each cartridge in the first receptacle, moving the conveyor belt so that the first receptacle and cartridge are positioned in alignment with the first operating position, and then moving the film cartridge to the second receptacle by lifting the same from the conveyor belt while advancing the conveyor belt rearwardly. The second receptacle and cartridge are then moved into alignment with the second operating position. The table is lowered to position the cartridge in the second receptacle.

In the preferred embodiment, the drive means is an electrical stepping motor. Also, the belt conveyor assembly is mounted for vertical movement with respect to the housing so as to permit the belt conveyor assembly to be lowered to facilitate the loading and unloading of the film cartridges. The belt conveyor assembly also includes a conveyor frame having a top wall surface wherein the film cartridges are maintained in fixed position against the conveyor housing top wall surface when the table selectively lifts the film cartridges from the conveyor belt.

BRIEF DESCRIPTION OF THE DRAWINGS

Some of the objects and advantages of the present invention having been stated, others will be more fully understood from the detailed description which follows and by reference to the accompanying drawings in which.

DETAILED DESCRIPTION OF THE PREFERRED EMBODIMENT

Figure 1:
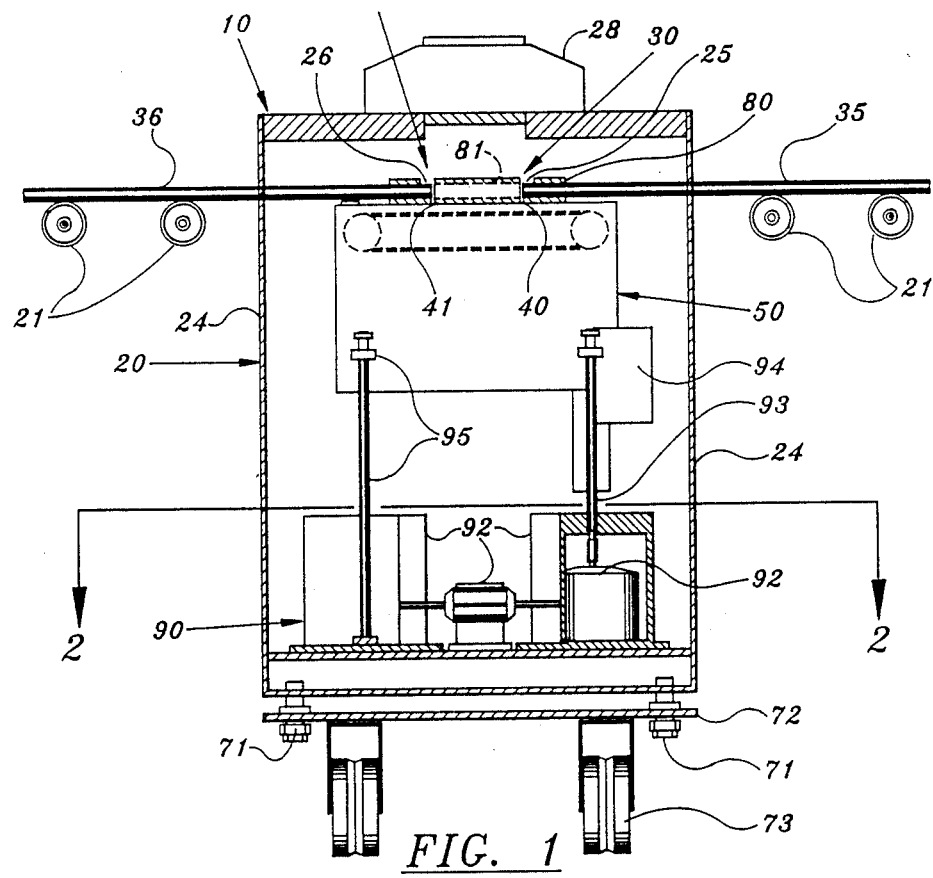
FIG. 1 is an end sectional view of the housing in accordance with the present invention showing the position of the belt conveyor assembly in the housing.

Referring to the drawings, and more particularly to FIG. 1, the apparatus for inspecting the quality of both ends of nuclear fuel rods in accordance with the present invention is indicated by reference numeral 10. As will be explained in detail later, the apparatus 10 includes a housing 20 having a pair of longitudinally separated slots 25, 26 inside the housing for receiving X-rays downwardly therethrough from an X-ray generator 28 conventional to the art. The X-ray generator 28 is secured to the top surface of the housing 20. Generated X-rays pass through the slots 25, 26 to define first and second longitudinally spaced apart operating positions 30, 31.

A walking beam and roller guide assembly conventional to the art and shown schematically at 21, serially guides first and second sets of nuclear fuel rods 35, 36 longitudinally through the housing to a first rod position 40 where the forward ends of the rods are aligned below the first operating position 30 and to a second rod position 41 where the rear ends of the rods are aligned below the second operating position 31.

Figure 3:
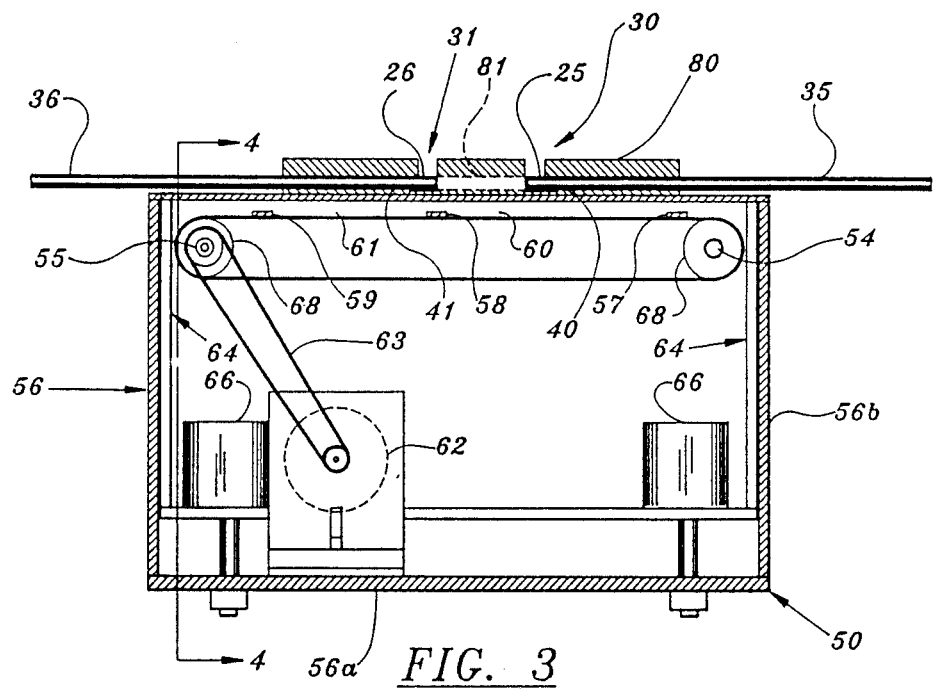
FIG. 3 is an enlarged sectional view of the belt conveyor assembly showing in detail the functional components of the assembly with the table in its raised position.
Figure 4:
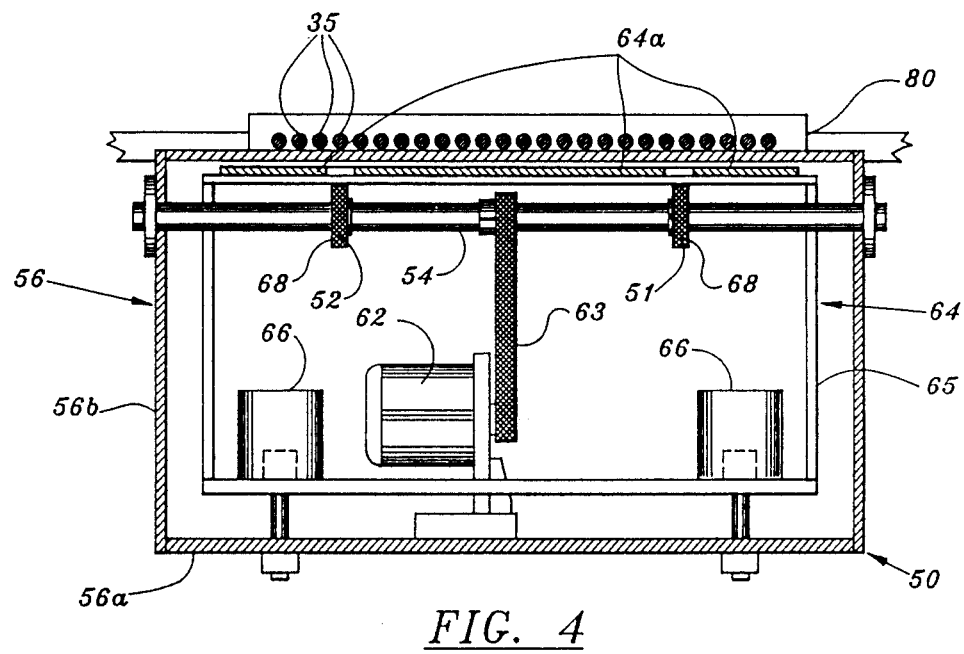
FIG. 4 is a side sectional view of the belt conveyor assembly taken along line 4—4 of FIG. 3.
Figure 5:
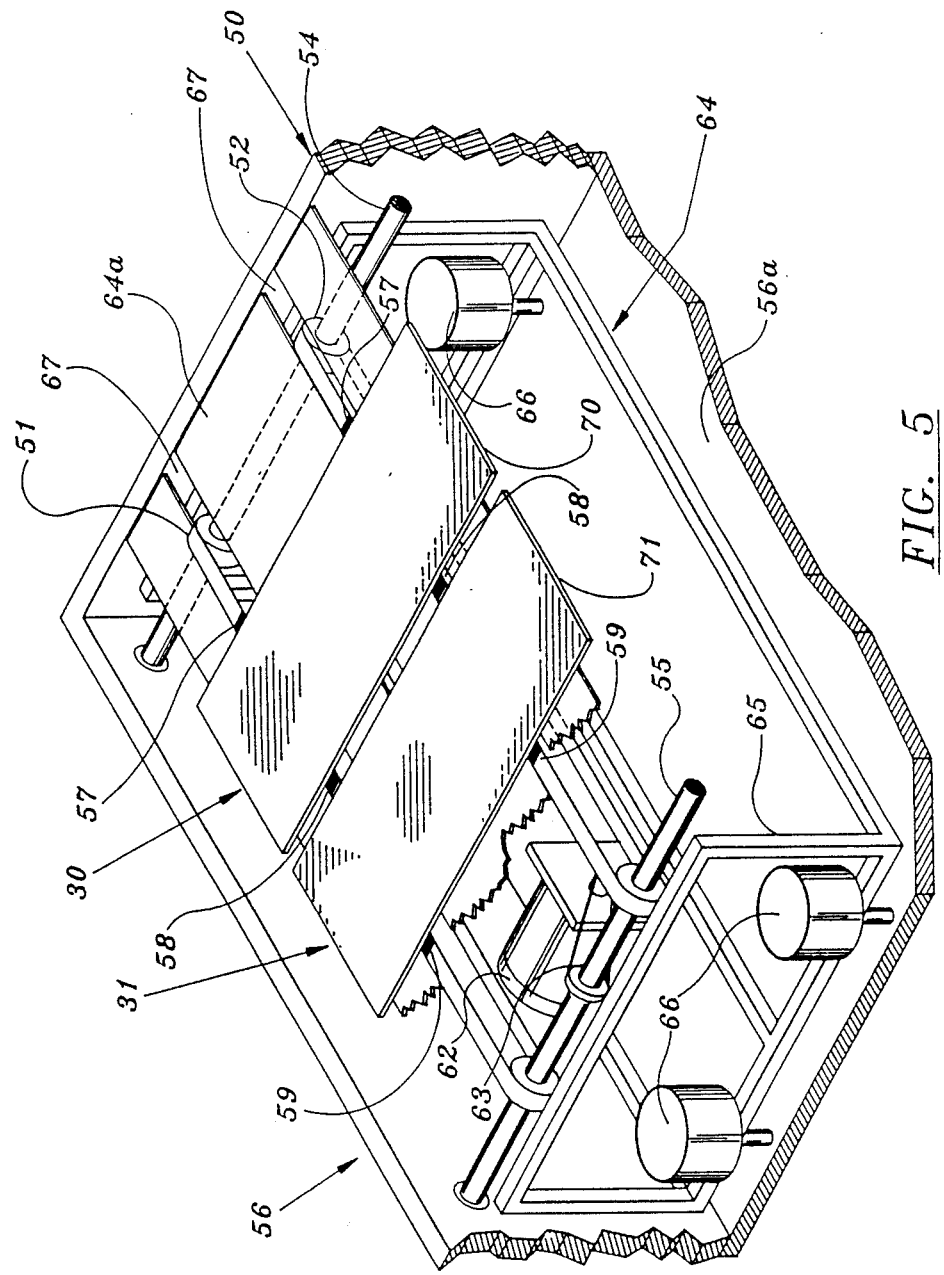
FIG. 5 is a somewhat schematic partial cut-a-way isometric view of the belt conveyor assembly showing in detail the relationship between the table and the belts.

A belt conveyor assembly 50 is supported within the housing 20. The assembly 50 serially advances first and second X-ray film cartridges 70, 71 (FIG. 5) longitudinally through the housing 20 and below the rods 35, 36 so that each cartridge may be selectively aligned below the first and second operating positions 30, 31. As shown in FIGS. 3–5, the belt conveyor assembly 50 is formed from two parallel endless conveyor belts 51, 52 entrained about two laterally directed support rods 54, 55 supported by a belt conveyor assembly frame 56. Each conveyor belt 51, 52 has three longitudinally spaced apart cleats 57, 58, 59 mounted on the belt so as to define first and second cartridge receptacles 60, 61 between respective pairs of cleats (FIG. 3). A drive motor 62 interconnects one of the support rods 55 for selectively advancing the conveyor belts 51, 52 together in either direction. A table 64 extends the length of the belts and is adapted to selectively lift any film cartridges 70, 71 from the conveyor belts 51, 52 so that the conveyor belts can be advanced while the film cartridges are held stationary (FIG. 5).

As will be explained in more detail hereafter, film cartridges 70, 71 are serially advanced through the housing 20 and exposed to X-rays at each of the first and second operating positions 30, 31. Each film cartridge 70, 71 is adapted to image each end of a fuel rod by initially positioning a first cartridge 70 in the first receptacle 60 and moving the conveyor belts 51, 52 so that the first film cartridge 70 is positioned in alignment with the first operating position 30. Three exposures are taken of each rod end. After each individual exposure, the conveyor belts 51, 52 are incrementally advanced a predetermined distance to move the film cartridge 70 so that a new unexposed portion of the cartridge underlies the rod ends. The rods are rotated 60° and an exposure is made of the rod end in a different orientation. The first film cartridge 70 then is moved to the second receptacle 61 by raising the table 64 and lifting the film cartridge 70 from the conveyor belts 51, 52 while advancing the conveyor belts 51, 52 rearwardly to align the second receptacle 61 with the stationary first film cartridge 70. The table 64 is then lowered to drop the first film cartridge 70 into the second receptacle 61.

A new film cartridge is placed into the now empty first film cartridge receptacle 60. The first set of rods 35 is advanced through the housing so that the rear ends of those rods are aligned below the second operating position 31. A new second set of rods is advanced into the housing so that the front ends are aligned under the first operating position 30. The sequence then starts again and is repeated.

Referring again to the details shown in FIG. 1, the housing 20 is rectangularly configured and fabricated from lead plates. Lead is desirable because it absorbs X-rays and acts as a shield preventing harmful X-rays from passing through the housing to personnel positioned in close proximity thereto. The X-ray generator 28 is conventional to the art and positioned at the top of the housing 20 where the lead shielding is minimized to allow passage of generated X-rays into the housing. Although not illustrated in detail, the X-ray generator 28 is supported by the housing 20 and other means external to the housing. The X-ray generator 28 is supported so that the X-ray focal plane is substantially parallel to the conveyor belt assembly 50. The focal plane can be adjusted so that the plane of the X-ray generator is parallel with the plane of any film cartridges by rotating conventional screw thread level adjustments 71 positioned at each lower corner between the housing 20 and a heavy support plate 72.

Heavy roller wheels 73 are positioned at the bottom of the support plate 22 to facilitate movement of the housing 20. In actual operation, the housing 20 is positioned in a much larger frame assembly (not shown) which includes the conventional walking beam and roller assembly 21 to transport and guide fuel rods into the housing. Maintenance and repair of the apparatus 10 is facilitated because the housing 20 can be rolled from the frame assembly for ready accessibility thereto.

As shown schematically in FIG. 1, two opposing side walls 24 of the housing each have an opening (not shown in detail) to facilitate guiding of a set of twenty-five fuel rods from the conventional walking beam and roller assembly 21 into the housing 20. Two zirconium blocks, hereafter referred to as a guide correction block 80, are rigidly fixed to the top of assembly 50 and positioned underlying the X-ray generator 28. The zirconium guide correction block 80 includes apertures 81 therethrough in coaxial alignment with the openings in side walls 24 so that fuel rods may be advanced into the guide correction block 80 so as to position the ends of fuel rods in either first or second rod positions 40, 41. The guide correction block 80 is masked with lead except at two spaced-apart locations to allow generated X-rays to pass downwardly therethrough. These two unmasked positions form the slots 25, 26 through which X-rays pass. The slots 25, 26 are typically about 0.75 inches (1.9 centimeters) wide and define the respective first and second spaced apart operating positions 30, 31 or "windows" through which X-rays pass. These two operating positions 30, 31 correspond to the area in the guide correction block 80 at which the ends of the fuel rods will be positioned during exposure of film cartridges 70, 71 positioned thereunder.

Figure 2:
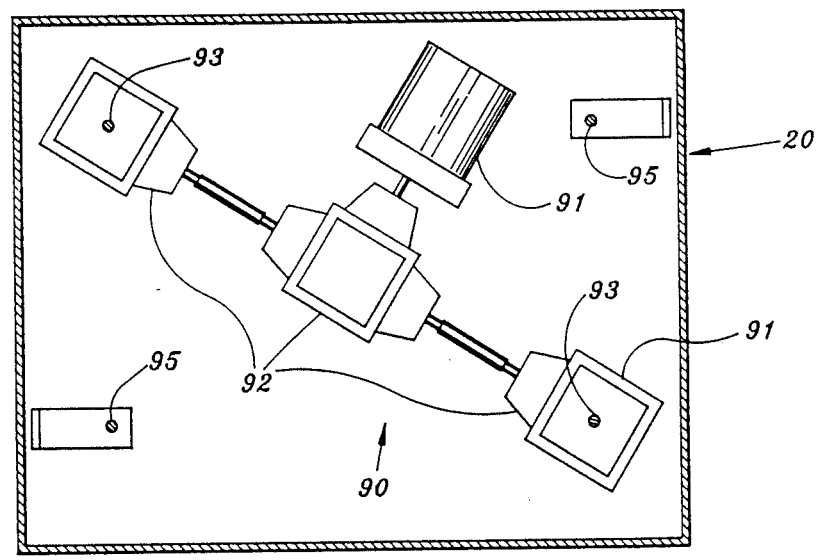
FIG. 2 is a top plan view taken along line 2—2 of FIG. 1 and showing the right angle drive gear motor mounting the belt conveyor assembly for vertical movement.

As illustrated in FIG. 1, the belt conveyor assembly 50 is supported within the housing 20 by a conventional high precision lifting mechanism 90. The lifting mechanism 90 interconnects the belt conveyor assembly 50 and lowers the assembly when rods are advanced through the housing or film cartridges are inserted or replaced. Because the film cartridges are positioned a predetermined distance from the x-ray generator during exposure to maintain a quality focus to image the rod ends, the lifting mechanism is precise. In the preferred embodiment, the lifting mechanism is a precision stepping gear motor 91 connecting a right angle drive system 92 interconnecting two precision lead screws 93 (FIGS. 1 and 2). The lead screws 93 interconnect bearing collets 94 positioned at two opposing lower corners of the belt conveyor assembly frame 56. To maintain stability of the conveyor belt assembly 50, the other two opposing corners are supported on shaft and bearing assemblies 95.

Referring now more particularly to FIGS. 3-5, there is illustrated in detail the belt conveyor assembly 50 in accordance with the present invention. As illustrated, the belt conveyor assembly includes a conveyor frame 56 having respective bottom and side walls surfaces 56a and 56b forming a substantially rectangular configuration thereat. The two laterally directed support rods 54, 55 are rotatably mounted on two opposing frame side walls 56b. Two endless conveyor belts 51, 52 are entrained about the support rods 54, 55 and supported thereon by conventional shaft pulleys 68. Each endless conveyor belt 51, 52 is approximately 2.5 centimeters wide and formed from a material having sufficient resiliency and strength such as rubber. As illustrated in FIG. 5, at least three cleats 57, 58, 59 are positioned on each belt with the cleats on one belt positioned in corresponding relation with cleats of the other belt so as to define the first and second film cartridge receptacles 60, 61 extending transverse to the belts and between respective pairs of cleats. The cleats 57, 58, 59 can be attached to the belts 51, 52 by means conventional to the art such as mechanical fasteners or adhesives. As illustrated, first and second film cartridges 70, 71 rest on the belts 51, 52 between the cleats. A film cartridge typically is 5 inches (13 centimeters wide), 17 inches (43 centimeters long), and 0.19 inches (0.5 centimeters) thick and formed from a two ply paperboard having an X-ray sensitive film inserted therebetween. The film cartridges are placed manually into the film receptacles when the belt conveyor assembly 50 is in its lowered position. A lead door (not shown) on the housing 20 provides access to an opening (not shown) fabricated in the belt conveyor assembly frame 56 to permit placement of film cartridges in the receptacles 60, 61.

In the preferred embodiment the drive motor 62 is a stepping motor and interconnects the second support rod 55 via a belt transmission 63 to provide accurate and incremental advancing of the conveyor belts 51, 52 in either a forward or reverse direction. As will be explained in detail hereafter, the stepping motor provides accurate advancement of the film cartridges 70, 71 positioned under the respective first or second operating positions 30, 31 to allow multiple exposures. The stepping motor 62 is operated by a controlled numologic. Each revolution of the motor shaft corresponds to 12,800 incremental steps, thus maintaining high accuracy in belt positioning. After each exposure, the conveyor belts 51, 52 are advanced approximately 0.75 inches (1.9 centimeters) to position a clear, unexposed portion of a film cartridge in the 0.75 inches (1.9 centimeter) wide operating position or "window" formed by the slots 25, 26. When a film cartridge has been exposed, six parallel rows of images are produced thereon corresponding to three exposures each of front and rear ends of a fuel rod.

As best illustrated in FIG. 5, a table 64 extends longitudinally in the belt conveyor assembly 50 and is supported by the belt conveyor assembly frame 56. The table 64 can be raised or lowered by pistons 66 interconnecting the frame 65 with the belt conveyor assembly frame bottom surface 56a. The table 64 includes three plates 64a secured to the table frame 65. The plates 64a are positioned to form at least two channels 67 having the conveyor belts 51, 52 in association therewith. Thus, the table 64 can be lowered or raised so that the top portions of the conveyor belts 51, 52 extend above or below the plates 64a. As illustrated in FIG. 5, the table is in a lowered position with the top portion of the belts extending above the plates 64a. The film cartridges 70, 71 rest on the conveyor belts 51, 52 allowing incremental advancing of the belts and cartridges.

The table 64 serves a dual function. First, during exposure, it is necessary to place the film cartridges in a fixed position relative to the fuel rod ends to maintain adequate focusing during exposure. Because the conveyor belts 51, 52 have a certain resiliency to them, the distance between the film cartridges 70, 71 resting on the belts and the fuel rod ends will vary. This problem is solved by the function of the table 64. At each exposure, the table 64 is raised to lift the film cartridges 70, 71 off the belts 51, 52 and press the film cartridges against the lower surface of the guide correction block 80 positioned on top of the belt conveyor assembly 50. Because each film cartridge is compressed against a rigid surface, the film cartridges 70, 71 are positioned a predetermined distance from the fuel rod ends positioned at first and second operating portions 30, 31.

Second, the table 64 is used in the shuttling sequence where a film cartridge is transferred from the first film cartridge receptacle 60 to the second film cartridge receptacle 61. A cartridge positioned in the first film cartridge receptacle 60 is lifted from the conveyor belts 51, 52 so that the belts can be reversed to position the second film cartridge receptacle 61 in alignment with the film cartridge resting on the table. When the table 64 is lowered, the film cartridge also is lowered into the second film cartridge receptacle 61. A new film cartridge is placed into the now empty first film cartridge receptacle 60. Thus, movement of the conveyor belts 51, 52 is not completely unilateral and the accumulated mechanical error often present with prior art practices is avoided.

Referring now to FIGS. 6-11, the relative positions of the cleats 57, 58, 59 during loading, unloading and imaging rod ends in accordance with the present invention are shown. For purposes of illustration only, only one rod instead of a full set of twenty-five rods will be referred to hereafter. Six exposures are made of a fuel rod—three exposures of the front end of the rod and three exposures of the rear end of the rod. After each exposure, the rod is rotated 60° so that an exposure of each rod end in a different orientation is made. Although more exposures of each rod end could be produced if a larger film cartridge was used, three exposures of each end have been found sufficient to give adequate imaging of a fuel rod end and determine defects therein.

Figure 6:
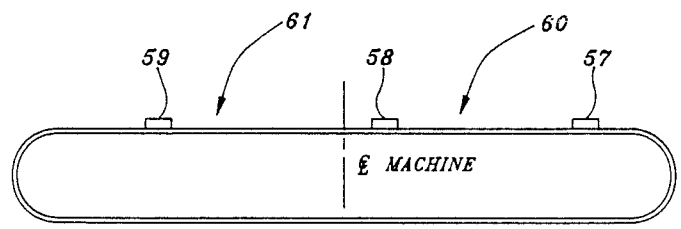
FIG. 6 is a side view of the belts showing the cleat positions for exposures 1 and 4.
Figure 7:
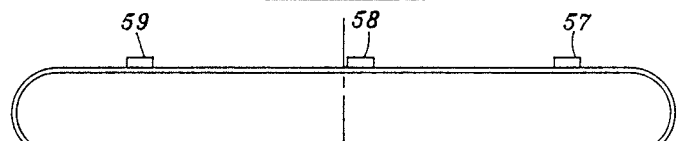
FIG. 7 is a side view of the belts showing the cleat positions for exposures 2 and 5.

FIG. 6 illustrates the cleat positions for Exposure Numbers 1 and 4. Exposure 1 corresponds to the first exposure of a first film cartridge positioned in the first film cartridge receptacle 60 to image the front end of a first fuel rod 35. Exposure 4 corresponds to the fourth exposure of a second film cartridge positioned in the second film cartridge receptacle 61 to image the rear end of a second fuel rod 36. The film cartridge positioned in the second receptacle 61 already has been exposed three times to image the front end of that second rod 36 when it previously had been positioned in the first rod position 40.

At this time, the table 64 is extended to press the film cartridges against the guide correction block 80. The X-ray generator 28 is activated and X-rays pass through the slots 25, 26 to image on the first film cartridge 70 the front end of the first fuel rod 35, and concurrently image on the second film cartridge the rear end of the second fuel rod 36. To prevent overlap on the second film cartridge between the fourth exposure and the first, second or third exposures, the second slot 26 is machined in the guide correcting block 80 to position the slot 26 so that the X-rays passing therethrough are delivered on the second film cartridge rearwardly of parallel exposures 1, 2 and 3.

Figure 8:
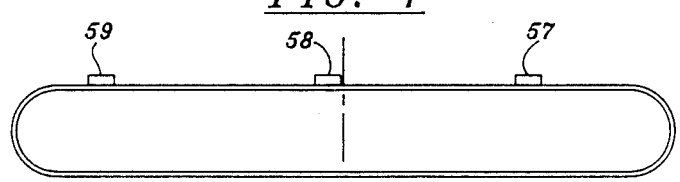
FIG. 8 is a side view of the belts showing the cleat positions for exposures 3 and 6.

After the first and fourth exposures, the table 64 is lowered so that the film cartridges are resting on the belts between respective pairs of cleats 57, 58, 59. The conveyor belts 51, 52 are advanced forward approximately 0.75 inches (1.9 centimeters) (FIG. 7) and the rods rotated 60°. The table 64 is raised again to press the film cartridges against the guide correction block 80. The second and fifth exposures are taken. Because the actual slots 25, 26 or "windows" through which the X-rays pass are 0.75 inches (1.9 centimeters) wide, and the conveyor belts 51, 52 have advanced approximately 0.75 inches (1.9 centimeters), the first and second, and fourth and fifth images do not overlap. The table 64 is lowered again to rest the film cartridges on the conveyor belts. The belts are advanced another 0.75 inches (1.9 centimeters) and the rods 35, 36 rotated another 60°. The table 64 is raised again and the third and sixth exposures made (FIG. 8).

After the sixth exposure, the film cartridge positioned in the second film cartridge receptacle 61 is now complete having six parallel exposures corresponding to three exposures each of respective front and rear ends. This cartridge is removed from the housing 20. The first film cartridge having only three exposures of the front end of a rod is transferred to the second film cartridge receptacle 61.

Figure 9:
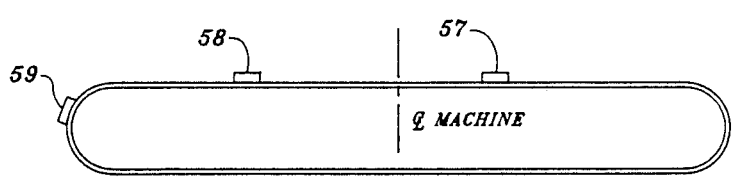
FIG. 9 is a side view of the belts showing the cleat positions during film cartridge unloading.

To transfer and remove respective first and second film cartridges as described above, the conveyor belt assembly 50 is lowered and the second rod 36 advanced from the housing 20 and conveyed by the walking beam and roller guide assembly 21 to another area for future processing. The first rod 35 is advanced through the housing 20 and positioned outside the housing adjacent the second operating position 31. The conveyor belts are forwardly advanced approximately 3 inches (7.5 centimeters) and the film cartridge positioned in the second film cartridge receptacle removed (FIG. 9). The table 64 is extended to raise the film cartridge positioned in the first receptacle 60 from the conveyor belts 51, 52. The conveyor belts 51, 52 are reversed approximately 5.5 inches (14 centimeters) so that the second film cartridge receptacle 61 is aligned with the film cartridge positioned on the table. This position of alignment is indicated on FIG. 10 by cleat positions 58' and 59'

Figure 10:
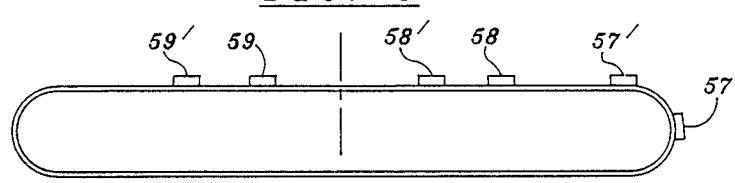
FIG. 10 is a side view of the belts showing the cleat positions during film cartridge loading.
Figure 11:
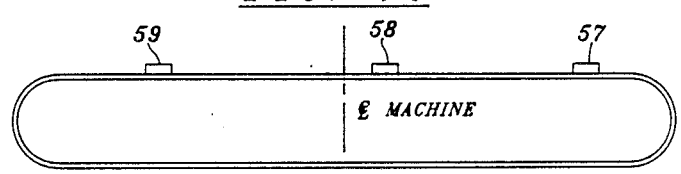
FIG. 11 is a side view of the belts showing the cleat positions at the initial repeat of the exposure process for exposures 1 and 4.

The table 64 is lowered to place the first film cartridge between cleats 58, and 59, The conveyor belts 51, 52 are reversed again approximately 5 centimeters and a new film cartridge positioned on the conveyor belts so that the leading edge of the new film cartridge is set against cleat 58 (FIG. 10). The first fuel rod 35 is advanced back into the housing so that its rear end is aligned under the second operating position 31. A new fuel rod is advanced into the housing 20 so that its front end is aligned under the first operating position 30. The belt conveyor assembly 50 is raised and the conveyor belts 51, 52 advanced to align the film cartridges under the respective operating positions. The cycle is then repeated.

The foregoing embodiment is to be considered illustrative, rather than restrictive of the invention and the modifications which come within the meaning and range of equivalents of the claims are to be included therein.

That which is claimed is:

1. An apparatus for inspecting the quality of both ends of nuclear fuel rods and comprising
    a housing including a pair of longitudinally separated slots for receiving X-rays downwardly therethrough from an external source and so as to define first and second longitudinally spaced apart operating positions,
    means for serially guiding nuclear fuel rods longitudinally through said housing and to a first rod position wherein the forward ends of the rods are aligned below said first operating position and to a second rod position wherein the rear ends of the rods are aligned below said second operating position,
    belt conveyor assembly means for serially advancing X-ray film cartridges longitudinally through said housing and below said rods, and so that each cartridge may be selectively aligned below said first and second operating positions, said belt conveyor assembly means comprising at least one endless conveyor belt, at least three longitudinally spaced apart cleats mounted on said conveyor belt and so as to define first and second film cartridge receptacles between respective pairs of cleats, drive means for selectively advancing said conveyor belt in opposite directions, and table means for selectively lifting the film cartridges from said conveyor belt and so that the conveyor belt may be advanced while the film cartridges are held stationary,
    whereby film cartridges may be serially advanced through said housing and exposed to X-rays at each of said first and second operating positions and so that each film cartridge is adapted to image each end of a given fuel rod, by initially positioning each cartridge in said first receptacle, moving the conveyor belt so that said first receptacle and cartridge are positioned in alignment with said first operating position, moving the film cartridge to said second receptacle by lifting the same from said conveyor belt while advancing the conveyor belt rearwardly, and then moving the second receptacle and cartridge into alignment with said second operating position.

2. The apparatus as defined in claim 1 wherein said drive means includes an electrical stepping motor.

3. The apparatus as defined in claim 1 further comprising means mounting said belt conveyor assembly means for vertical movement with respect to said housing and so as to permit said belt conveyor assembly means to be lowered to facilitate the loading and unloading of film cartridges therefrom.

4. The apparatus as claimed in claim 1 wherein said belt conveyor assembly means includes a top wall surface positioned so that said film cartridges are maintained in fixed position against said top wall surface when said table means selectively lifts film cartridges from said conveyor belt.

5. The apparatus as claimed in claim 1 including means positioned along the bottom of said housing for facilitating movement of said housing.

6. The apparatus as claimed in claim 1, wherein said housing is formed of lead.

7. An apparatus for inspecting the quality of both ends of nuclear fuel rods and comprising
    a housing including a pair of longitudinally separated slots for receiving X-rays downwardly therethrough from an external source and so as to define first and second longitudinally spaced apart operating positions,
    means for serially guiding nuclear fuel rods longitudinally through said housing and to a first rod position wherein the forward ends of the rods are aligned below said first operating position and to a second rod position wherein the rear ends of the rods are aligned below said second operating position,
    belt conveyor assembly means for serially advancing X-ray film cartridges longitudinally through said housing and below said rods, and so that each cartridge may be selectively aligned below said first and second operating positions, said belt conveyor assembly means including a conveyor frame having two opposing side wall surfaces, at least two laterally directed support rods rotatably mounted to said opposing side wall surfaces, at least two endless conveyor belts entrained about said support rods in spaced relation to each other, at least three longitudinally spaced apart cleats mounted on each conveyor belt and so as to define first and second film cartridge receptacles extending transverse to said belts and between respective pairs of cleats so that said belts support a film cartridge positioned thereon, drive means supported by said conveyor frame and operatively engaging select ones of said support rods for selectively advancing said conveyor belt in opposite directions, and table means supported by said conveyor frame for selectively lifting the film cartridges supported by said belts and so that the conveyor belts may be advanced while the film cartridges are held stationary,
    whereby film cartridges may be serially advanced through said housing and exposed to X-rays at each of said first and second operating positions and so that each film cartridge is adapted to image each end of a given fuel rod, by initially positioning each cartridge in said first receptacle, moving the conveyor belts so that said first receptacle and cartridge are positioned in alignment with said first operating position, moving the film cartridge to said second receptacle by lifting the same from said conveyor belts while advancing the conveyor belts rearwardly, and then moving the second receptacle and cartridge into alignment with said second operating position.

8. The apparatus as claimed in claim 7 wherein said conveyor frame includes a top wall surface positioned so that said film cartridges are maintained in fixed position against said top wall surface when said table means selectively lifts the film cartridges from said conveyor belts.

9. The apparatus as claimed in claim 7 wherein said table means includes means operatively engaging said conveyor frame for providing lift to said table means.

10. The apparatus as claimed in claim 7 wherein said table means includes at least two longitudinally extending channels extending the length of said belts, and wherein said channels are positioned so that said belts are in association with said channels so that said table means can retract below the top portion of said belts.

* * * * *